on">

United States Patent
Han et al.

(10) Patent No.: US 7,461,980 B2
(45) Date of Patent: Dec. 9, 2008

(54) TRANSMITTER OPTICAL SUB-ASSEMBLY RECEPTACLE WITH THICKER SPLIT SLEEVE

(75) Inventors: Meng Kwang Han, Singapore (SG); Hock Aun Neoh, Singapore (SG); Albert Wooi Quan Khor, Singapore (SG)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 87 days.

(21) Appl. No.: 11/225,476

(22) Filed: Sep. 13, 2005

(65) Prior Publication Data
US 2007/0058906 A1    Mar. 15, 2007

(51) Int. Cl.
*G02B 6/38* (2006.01)

(52) U.S. Cl. .............................. 385/60; 385/53; 385/54; 385/55; 385/56

(58) Field of Classification Search ............. 385/53–56, 385/58, 60
See application file for complete search history.

(56) References Cited

U.S. PATENT DOCUMENTS 5,887,095 A        3/1999   Nagase et al.
2003/0231838 A1*  12/2003   Takeda et al. ................. 385/60

* cited by examiner

*Primary Examiner*—Frank Font
*Assistant Examiner*—Erin D Chiem

(57) ABSTRACT

A transmitter optical sub-assembly receptacle includes a thicker split sleeve positioned within a cylindrical shell structure and partly within a base structure such that a fiber ferrule, which is positioned within the base structure, is partly within the thicker split sleeve. The split sleeve has a thickness larger than 0.187 millimeter.

17 Claims, 2 Drawing Sheets

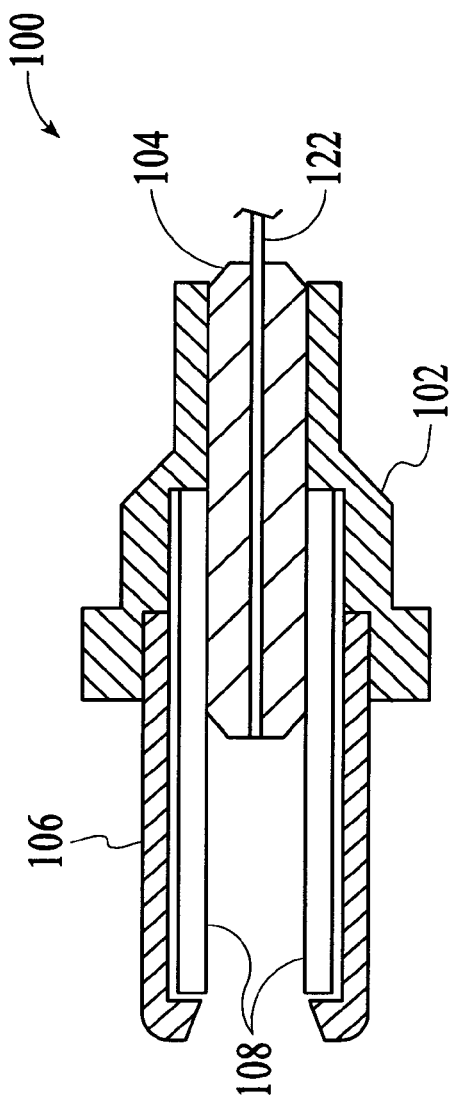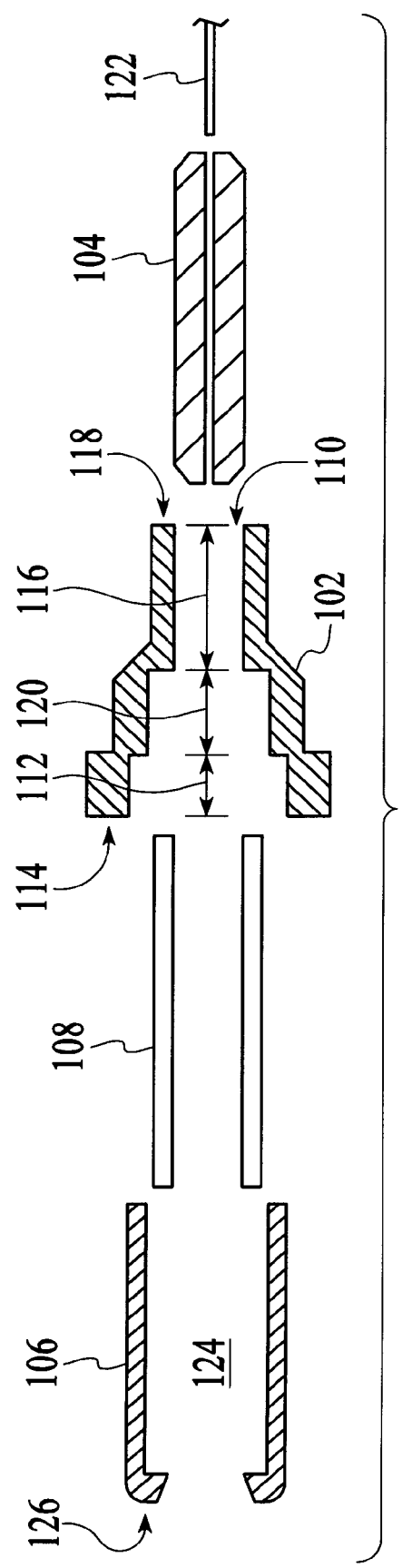
FIG.1
FIG.2

TRANSMITTER OPTICAL SUB-ASSEMBLY RECEPTACLE WITH THICKER SPLIT SLEEVE

BACKGROUND OF THE INVENTION

Optical transceivers transmit and receive optical signals in optical communications systems. An optical transceiver includes a transmitter optical sub-assembly (TOSA) to transmit outgoing optical signals and a receiver optical sub-assembly (ROSA) to receive incoming optical signals. Each of the TOSA and the ROSA includes an optical port, which is designed to be connected to a connector of a fiber optic cable, such as a patchcord, so that optical signals from and to the optical transceiver can be transmitted through the fiber optic cables connected to the TOSA and the ROSA.

Some conventional optical transceivers are susceptible to fiber optic cable induced stress at the optical ports, which is commonly referred to as "Wiggle". The Wiggle stress results in variations in the transmitted optical power, which may lead to signal levels falling below the optical link budget requirements and adversely impact data integrity. This degradation of signal levels is typically more pronounced on the transmit side compared to the receive side. Thus, Wiggle stress is more of a concern for the TOSA of an optical transceiver rather than the ROSA of the optical transceiver.

The transmitted optical power degradation due to Wiggle stress is dependent on the optical port of a TOSA, as well as the connector of a fiber optic cable connected to that optical port. The optical port of a TOSA is provided by a TOSA receptacle, which includes a housing assembly, a split sleeve and a fiber ferrule. The housing assembly is configured to accommodate the split sleeve and the fiber ferrule. The fiber ferrule is used to secure an optical fiber, which has an end positioned to receive optical signals from a laser diode of the TOSA. The fiber ferrule is partly positioned within the split sleeve. The unoccupied region within the split sleeve is used receive the connector of the fiber optic cable so that the optical fiber in the fiber optic cable can be optically aligned with the optical fiber in the fiber ferrule of the TOSA receptacle.

A concern with the conventional TOSA receptacle is that the loss of optical power (LOP) due to Wiggle stress can be significant.

In view of this concern, what is needed is a TOSA receptacle that can reduce the LOP drift due to Wiggle stress.

SUMMARY OF THE INVENTION

A transmitter optical sub-assembly (TOSA) receptacle includes a split sleeve positioned within a cylindrical shell structure and partly within a base structure such that a fiber ferrule, which is positioned within the base structure, is partly within the split sleeve. The split sleeve has a thickness larger than 0.187 millimeter. The split sleeve is thicker than the split sleeve in a comparable conventional TOSA receptacle. The thicker split sleeve reduces loss of optical power due to Wiggle stress. As a result, the performance of the TOSA receptacle is significantly increased with respect to transmitted optical power.

A transmitter optical sub-assembly receptacle in accordance with an embodiment of the invention comprises a base structure, a fiber ferrule, a cylindrical shell structure and a split sleeve. The base structure includes a longitudinal hole. The fiber ferrule is positioned within the longitudinal hole of the base structure. The cylindrical shell structure is partly positioned within the longitudinal hole of the base structure. The split sleeve is positioned within the cylindrical shell structure and partly within the longitudinal hole of the base structure such that a part of the fiber ferrule is positioned within the split sleeve. The split sleeve has a thickness larger than 0.187 millimeter.

A transmitter optical sub-assembly receptacle in accordance with another embodiment of the invention comprises a base structure, a fiber ferrule, a cylindrical shell structure and a split sleeve. The base structure includes a longitudinal hole, which has a first circular hole section at a first end of the base structure and a second circular hole section at a second end of the base structure. The diameter of the first circular hole section is larger than the diameter of the second circular hole section. The fiber ferrule is positioned within the longitudinal hole of the cylindrical base structure. The cylindrical shell structure is partly positioned within the first circular hole section of the longitudinal hole of the base structure. The split sleeve is positioned within the cylindrical shell and partly within the longitudinal hole of the base structure such that a part of the fiber ferrule is positioned within the split sleeve. The split sleeve has a uniform thickness larger than 0.187 millimeter.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIG. 1 is a cross-sectional view of a transmitter optical sub-assembly (TOSA) receptacle in accordance with an embodiment of the invention.

FIG. 2 is a cross-sectional exploded view of the TOSA receptacle of FIG. 1.

DETAILED DESCRIPTION

Figure 3:
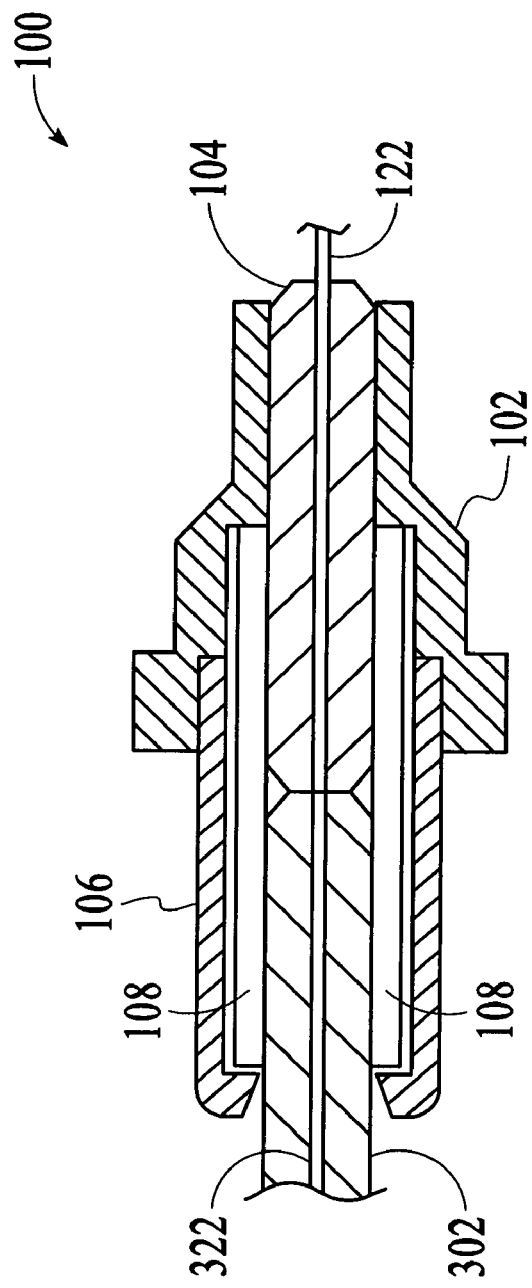
FIG. 3 is another cross-sectional view of the TOSA receptacle of FIG. 1, illustrating a connector of a patchcord inserted into the TOSA receptacle.

With reference to FIGS. 1 and 2, a transmitter optical sub-assembly (TOSA) receptacle 100 in accordance with an embodiment of the invention is described. The TOSA receptacle 100 is used in a TOSA to receive a connecting end of a fiber optic cable, such as a patchcord, so that optical signals from the TOSA can be efficiently transmitted through the fiber optic cable. In this embodiment, the TOSA receptacle 100 is an LC type TOSA receptacle. However, in other embodiments, the TOSA receptacle 100 may be a different type of a TOSA receptacle. The TOSA receptacle 100 is designed to reduce transmitted light output power (LOP) loss due to Wiggle stress. Thus, the TOSA receptacle 100 can improve the performance of the TOSA.

FIG. 1 is a cross-sectional view of the TOSA receptacle 100, while FIG. 2 is an exploded view of the TOSA receptacle. As shown in FIGS. 1 and 2, the TOSA receptacle 100 includes a base structure 102, a fiber ferrule 104, a cylindrical shell structure 106 and a split sleeve 108. In this embodiment, the dimensions of the TOSA receptacle 100 formed by these components conform to the FOCIS (Fiber Optic Connector Intermateability Standard) 10 standard for LC receptacles. However, in other embodiments, the dimensions of the TOSA receptacle 100 may conform to other standards.

The base structure 102 of the TOSA receptacle 100 is a cylindrical structure that provides structural support for the other components of the TOSA receptacle. The base structure 100 includes a longitudinal hole 110 having a central axis that coincides with the axis of the base structure along its length. As shown in FIG. 2, the longitudinal hole 110 of the base structure 102 includes a circular hole section 112 at one end 114 of the base structure, a circular hole section 116 at the other end 118 of the base structure and an intermediate circular hole section 120 that connects the circular hole sections 112 and 116. The diameter of the circular hole section 112 is larger than the diameter of the intermediate section 120, which is larger than the diameter of the circular hole section 116. The diameters of the circular hole sections 112 and 116 are approximately 2.93 and 1.25 millimeters, respectively, while the diameter of the intermediate hole section 120 is approximately 1.64 millimeter. In this embodiment, the base structure 102 is made of a metal. However, in other embodiments, the base structure 102 can be made of other materials.

The fiber ferrule 104 of the TOSA receptacle 100 is used to hold an optical fiber 122 from an optical transmitter (not shown), such as a laser diode.

The fiber ferrule 104 is cylindrical in shape and has a diameter that is approximately equal to the diameter of the circular end section 116 of the base structure 102. Thus, the fiber ferrule 104 can be press fit into the longitudinal hole 110 of the base structure 102. The fiber ferrule 104 is positioned within the longitudinal hole 110 of the base structure 102 such that one end of the fiber ferrule, which will interface with a connector 302 of a patchcord inserted into the TOSA receptacle 100, as shown in FIG. 3, extends out of the circular hole section 112 of the base structure 102. Similarly, the other end of the fiber ferule 104 extends out of the circular hole section 116 of the base structure 102.

The cylindrical shell structure 106 of the TOSA receptacle 100 is used to receive the patchcord connector 302, as illustrated in FIG. 3. The cylindrical shell structure 106 includes a cylindrical hole 124, which is used to hold the split sleeve 108, as explained below. The diameter of the cylindrical hole 124 is approximately 2.92 millimeter, which is larger than the corresponding diameter of a comparable conventional TOSA receptacle, which is approximately 2.4 millimeter. The thickness of the cylindrical shell 106 along its length, which is parallel to the split sleeve 108, is uniform. This thickness is approximate 0.65 millimeter. At one end of the cylindrical shell structure 106 is a rim 126, which has a diameter smaller than the diameter of the cylindrical hole 124. The rim 126 is used to secure the split sleeve 108 in its place within the cylindrical shell structure 106, as described below. The other end of the cylindrical shell structure 106 is positioned completely within the circular hole section 112 of the base structure 102 at the interface between the circular hole section 112 and the intermediate hole section 120. The cylindrical shell structure 106 differs from the corresponding structure in a comparable conventional TOSA receptacle in that the thickness of the cylindrical shell structure 106 is uniform along its length. In the conventional TOSA receptacle, the corresponding structure is thinner at the end that is positioned within the base structure. Thus, the cylindrical shell structure 106 is thicker at the end that is positioned within the base structure 102. In this embodiment, the cylindrical shell structure 106 is made of a metal similar to the base structure 102. However, in other embodiments, the cylindrical shell structure 106 can be made of other materials.

Figure 4:
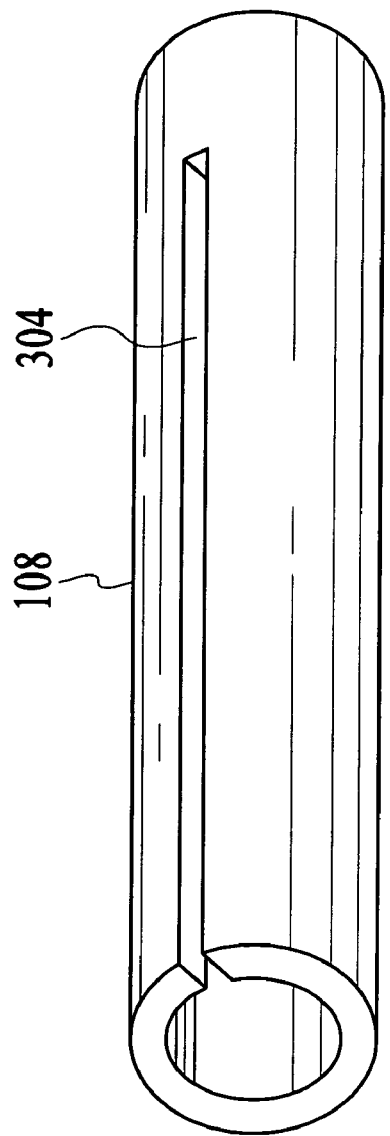
FIG. 4 is a perspective view of a split sleeve of the TOSA receptacle in accordance with an embodiment of the invention.

The split sleeve 108 of the TOSA receptacle 100 is used to secure the connector 302 of the patchcord, as illustrated in FIG. 3. As shown in FIG. 4, which is a perspective view of the split sleeve 108, the split sleeve is a cylindrical shell having a split 304 along its length. The split 304 allows the split sleeve 108 to increase its effective diameter when the patchcord connector 302 is inserted into the TOSA receptacle 100 to secure the patchcord connector to the TOSA receptacle. When the patchcord connector 302 is secured by the split sleeve 108, the optical fiber 322 of the patchcord is optically aligned with the optical fiber 122 of the fiber ferrule 104 so that optical signals can be transmitted from the optical fiber 122 of the fiber ferrule to the optical fiber 322 of the patchcord.

As shown in FIG. 1, the split sleeve 108 is positioned within the cylindrical hole 124 of the cylindrical shell structure 106 and partly within the longitudinal hole 110 of the base structure 102 such that the fiber ferrule 104 is partly positioned within the split sleeve 108. One end of the split sleeve 108 is positioned at the rim 126 of the cylindrical shell structure 106, while the other end of the split sleeve is positioned at the interface between the intermediate hole section 120 and the circular hole section 116 of the base structure 102. Since the diameter of the rim 124 is smaller than the diameter of the cylindrical hole 124 and the diameter of the circular hole section 116 is smaller than the diameter of the intermediate hole section 120, the split sleeve 108 is confined between the rim and the interface between the intermediate hole section 120 and the circular hole section 116.

In this embodiment, the split sleeve 108 has a uniform thickness of approximately 0.377 millimeter, compared to a thickness of 0.187 millimeter for the split sleeve in a comparable conventional TOSA receptacle. Thus, the split sleeve 108 is thicker than the conventional split sleeve. The thicker split sleeve 108 reduces LOP loss due to Wiggle stress, as described in more detail below. Thus, the performance of the TOSA receptacle 100 with respect to optical transmission efficiency is improved when compared to conventional TOSA receptacles.

TOSA receptacles can be tested to determine the amount of LOP loss due to Wiggle stress by performing a "Wiggle test". A Wiggle test uses a load on the patchcord connected to a TOSA receptacle to apply stress at the connection between the patchcord and the TOSA receptacle while measuring any degradation in optical transmission performance.

A Wiggle test was performed on a comparable conventional TOSA receptacle using one type of patchcords from Stratos International, Inc. The setup for the Wiggle test includes a TOSA with the TOSA receptacle being tested mounted on a suitable test board. The board is held in a vise, which is attached to the spindle of a stepper motor. The stepper motor is connected to a controller, which is interfaced with a computer via a parallel port connection. The controller's software allows control of the direction, speed and number of steps of the stepper motor. The patchcord is connected to an Agilent 8163A power meter to record the maximum power range of optical transmission power from the TOSA while applying a load in the form of a 0.25 lb "doughnut" weight on the connected patchcord and rotating the board in the clockwise and counterclockwise directions. The Wiggle test was performed for a particular patchcord ("unit") by rotating the board for a full clockwise rotation and a full counterclockwise rotation at a rate of about thirty (30) degrees per second using the computer controlled stepper motor.

The results of the Wiggle test for the conventional TOSA receptacle are shown in the following table.

| Unit | 1st Reading (dB) | 2nd Reading (dB) | 3rd Reading (dB) | 4th Reading (dB) | 5th Reading (dB) | Average Reading (dB) |
|---|---|---|---|---|---|---|
| 1 | 9.32 | 9.32 | 9.27 | 9.21 | 8.16 | 9.05 |
| 2 | 4.55 | 3.78 | 3.89 | 3.98 | 3.83 | 4.01 |
| 3 | 14.36 | 15.79 | 15.63 | 14.43 | 14.28 | 14.9 |
| 4 | 7.38 | 9.36 | 7.53 | 7.57 | 8.22 | 8.01 |
| 5 | 25.39 | 24.36 | 25.99 | 24.56 | 25.47 | 25.16 |
| 6 | 13.38 | 15.33 | 16.18 | 13.98 | 15.57 | 14.89 |
| 7 | 20.31 | 20.19 | 20.32 | 21.00 | 20.17 | 20.40 |
| 8 | 21.70 | 21.99 | 21.83 | 22.37 | 21.92 | 21.96 |
| 9 | 10.03 | 8.29 | 6.94 | 7.27 | 7.20 | 7.95 |
| 10 | 10.06 | 10.19 | 11.56 | 11.35 | 11.09 | 10.85 |
| 11 | 9.17 | 9.24 | 7.91 | 8.18 | 7.78 | 8.46 |
| Total Average Reading (dB) | | | | | | 13.24 |

In comparison, the results of the Wiggle test for the TOSA receptacle 100 using the same type of patchcords are shown in the following table.

| Unit | 1st Reading (dB) | 2nd Reading (dB) | 3rd Reading (dB) | 4th Reading (dB) | 5th Reading (dB) | Average Reading (dB) |
|---|---|---|---|---|---|---|
| 1 | 0.1238 | 0.1377 | 0.1425 | 0.1321 | 0.1313 | 0.1335 |
| 2 | 0.3362 | 0.3310 | 0.3206 | 0.2723 | 0.2357 | 0.2992 |
| 3 | 1.1059 | 0.2737 | 0.1642 | 0.0863 | 0.0839 | 0.1428 |
| 4 | 0.3199 | 0.1794 | 0.1677 | 0.1537 | 0.1485 | 0.1938 |
| 5 | 0.2177 | 0.1735 | 0.2218 | 0.2203 | 0.2211 | 0.2097 |
| 6 | 0.1048 | 0.1538 | 0.1532 | 0.1198 | 0.1076 | 0.1278 |
| 7 | 0.6547 | 0.6228 | 0.6203 | 0.6072 | 0.6830 | 0.6376 |
| 8 | 0.1687 | 0.1446 | 0.1426 | 0.1428 | 0.1361 | 0.1470 |
| 9 | 0.2208 | 0.2052 | 0.2083 | 0.1997 | 0.2600 | 0.2188 |
| 10 | 0.2097 | 0.2743 | 0.2342 | 0.2762 | 0.2396 | 0.2468 |
| 11 | 0.4279 | 0.4632 | 0.4315 | 0.4494 | 0.4112 | 0.4366 |
| 12 | 0.2665 | 0.2832 | 0.2765 | 0.2800 | 0.2459 | 0.2704 |
| 13 | 0.2718 | 0.2303 | 0.2306 | 0.1939 | 0.2451 | 0.2343 |
| 14 | 0.2803 | 0.1964 | 0.2133 | 0.1770 | 0.1670 | 0.2068 |
| 15 | 0.2378 | 0.2042 | 0.1961 | 0.1429 | 0.1469 | 0.1856 |
| Total Average Reading (dB) | | | | | | 0.2492 |

As shown in the above tables, the average LOP drift for the conventional TOSA receptacle is 13.24 dB, while the average LOP drift for the TOSA receptacle is 0.25 dB, which is a phenomenal improvement of almost 13 dB.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A transmitter optical sub-assembly receptacle comprising:
a base structure including a longitudinal hole;
a fiber ferrule positioned within said longitudinal hole of said base structure;
a cylindrical shell structure partly positioned within said longitudinal hole of said base structure; and
a split sleeve positioned within said cylindrical shell structure and partly within said longitudinal hole of said base structure such that a part of said fiber ferrule is positioned within said split sleeve, said split sleeve having a thickness larger than 0.187 millimeter,
wherein said longitudinal hole of said base structure includes a first circular hole section at a first end of said base structure and a second circular hole section at a second end of said base structure, said first end being engaged with said cylindrical shell structure, the diameter of said first circular hole section being larger than the diameter of said second circular hole section, and wherein said longitudinal hole of said base structure includes an intermediate hole section connecting said first circular hole section and said second circular hole section, the diameter of said intermediate hole section being smaller than said diameter of said first circular hole section and larger than said diameter of said second circular hole section, said diameter of said intermediate hole section being uniformed.

2. The receptacle of claim 1 wherein said thickness of said split sleeve is uniform.

3. The receptacle of claim 1 wherein said thickness of said split sleeve is approximately 0.377 millimeter.

4. The receptacle of claim 1 wherein said cylindrical shell structure includes a cylindrical hole in which said split sleeve is positioned, the diameter of said cylindrical hole being larger than 2.4 millimeter.

5. The receptacle of claim 4 wherein said diameter of said cylindrical shell structure is approximately 2.92 millimeter.

6. The receptacle of claim 1 wherein the thickness of said cylindrical shell structure along its length is uniform.

7. The receptacle of claim 1 wherein said cylindrical shell structure includes a cylindrical hole in which said split sleeve is positioned, said diameter of said intermediate hole section being substantially equal to the diameter of said cylindrical hole.

8. The receptacle of claim 1 wherein the dimensions of said receptacle resulting from said base structure, said fiber ferrule, said cylindrical shell structure and said split sleeve conform to the FOCIS 10 standard for LC receptacles.

9. The receptacle of claim 1 wherein said base structure and said cylindrical shell are made of metal and said split sleeve is made of ceramic material.

10. A transmitter optical sub-assembly receptacle comprising:
a base structure including a longitudinal hole, said longitudinal hole having a first circular hole section at a first end of said base structure and a second circular hole section at a second end of said base structure, the diameter of said first circular hole section being larger than the diameter of said second circular hole section;
a fiber ferrule positioned within said longitudinal hole of said base structure;
a cylindrical shell structure partly positioned within said first circular hole section of said longitudinal hole of said base structure; and
a split sleeve positioned within said cylindrical shell and partly within said longitudinal hole of said base structure such that a part of said fiber ferrule is positioned within said split sleeve, said split sleeve having a uniform thickness larger than 0.187 millimeter,
wherein said longitudinal hole of said base structure includes an intermediate hole section connecting said first circular hole section and said second circular hole section, the diameter of said intermediate hole section being smaller than said diameter of said first circular hole section and larger than said diameter of said second circular hole section, said diameter of said intermediate hole section being uniformed.

11. The receptacle of claim 10 wherein said uniform thickness of said split sleeve is approximately 0.377 millimeter.

12. The receptacle of claim 10 wherein said cylindrical shell structure includes a cylindrical hole in which said split sleeve is positioned, the diameter of said cylindrical hole being larger than 2.4 millimeter.

13. The receptacle of claim 12 wherein said diameter of said cylindrical shell structure is approximately 2.92 millimeter.

14. The receptacle of claim 10 wherein the thickness of said cylindrical shell structure along its length is uniform.

15. The receptacle of claim 10 wherein said cylindrical shell structure includes a cylindrical hole in which said split sleeve is positioned, said diameter of said intermediate hole section being substantially equal to the diameter of said cylindrical hole.

16. The receptacle of claim 10 wherein the dimensions of said receptacle resulting from said base structure, said fiber ferrule, said cylindrical shell structure and said split sleeve conform to the FOCIS 10 standard for LC receptacles.

17. The receptacle of claim 10 wherein said base structure and said cylindrical shell are made of metal and said split sleeve is made of ceramic material.

* * * * *